United States Patent Office

2,905,590
Patented Sept. 22, 1959

---

2,905,590
THIOXANTHENE DERIVATIVE

Jean Schmutz, Muri, near Berne, Switzerland, assignor, by mesne assignments, to The Wander Company, Chicago, Ill., a corporation of Delaware No Drawing. Application May 7, 1958
Serial No. 733,503

2 Claims. (Cl. 167—65)

This invention relates to a novel thioxanthene derivative having unique central nervous system effects in animals and humans.

It has been discovered that a new thioxanthene derivative substituted in the 9 position by an N-methyl-piperidyl-3-methyl group displays unexpected effectiveness in the treatment of Parkinson's disease and depressed states in humans. The compound of the invention has the following formula:

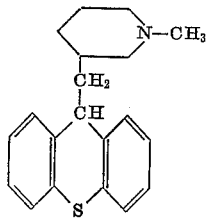

The pharmacological effect is quite specific for the above structure. Thus, while 9-(N-methyl-piperidyl-3-methyl)-thioxanthene possesses valuable anti-Parkinson effects, it is found that 9-(3-piperidyl-propyl)-thioxanthene has only a slight and therapeutically unimportant antitremorin effect.

The 9-(N-methyl-piperidyl-3-methyl)-thioxanthene described above is an organic base which can be reacted with acids to form readily water-soluble salts useful for oral or parenteral therapy. Although the free base is the source of the pharmacological utility of the compound, it is generally more convenient to employ the salts, particularly the hydrochlorides and the tartrates. The salts are formed by well known techniques, e.g. by neutralizing an ether solution of the base with an acetone or alcohol solution of the desired acid and recrystallizing the resultant salt from water-acetone or alcohol-ether. In the case of inorganic acids, it is preferred to employ hydrochloric acid, sulfuric acid, or phosphoric acid. Among the organic acids which can be used with good results are acetic acid, maleic acid, tartaric acid, and citric acid.

The pharmacological actions found for the new 9-(N-methyl-piperidyl-3-methyl)-thioxanthene differ both qualitatively and quantitatively from those of other substituted xanthenes and thioxanthenes previously suggested in the art as antispasmodic agents. Thus, in animal tests 9-(N-methyl-piperidyl-3-methyl) thioxanthene stimulates the central nervous system with very little effect on blood pressure. Therapeutic dosages inhibit central spastic effects on the musculature and exhibit an intense action upon Parkinson-like symptoms, i.e. they possess a marked antitremorin action [G. M. Everett, Nature 177, 1238 (1956)]. The usual forms of therapeutic administration may be employed. For example, the active substance may be composited with a suitable pharmaceutical carrier to provide solutions, syrups, tablets, capsules, dragees, suppositories, powders, or the like. The dosage unit form may contain from about 5 to about 100 mg. of the active substance. For example, in the case of solutions for injection, the ampoule may contain, by way of illustration, a 0.5 to 2% solution with 20 to 50 mg. of active substance per ampoule. For infusion, the ampoule may contain a 2 to 3% solution with 50 to 100 mg. of active substance per ampoule. In the case of tablets or the like the dosage of active substance may be 5 to 50 mg. and for suppositories 20 to 100 mg.

The synthesis of the new compound of the present invention is carried out most conveniently by first metallizing the thioxanthene in the 9 position and then reacting the resultant metallo derivative with 1-methylpiperidine-3-methyl ester of the general formula

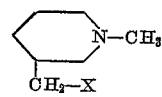

where X stands for a halogen, especially chlorine or bromine, or for an aryl sulfonate, particularly benzene sulfonate or p-toluene sulfonate. The reaction is preferably carried out in an inert solvent such as benzene, toluene, dioxane, anisole, etc. The preferred metallizing agents are the alkali metal compounds such as aryl sodium, particularly phenyl sodium and tolyl sodium, sodium amide, aryl lithium, alkyl lithium, etc. Usually, phenyl sodium, tolyl sodium, and sodium amide will be used because of their relative cheapness and availability. Both reactions can be carried out simultaneously if desired, i.e. the thioxanthene, the metallizing agent, and the 1-methyl-piperidine-3-methyl ester can all be reacted together.

The following specific example illustrates the method of preparation.

To 4.9 gm. of finely pulverized sodium in 50 ml. of absolute benzene add dropwise with stirring 12 gm. of chlorobenzene in 50 ml. of absolute benzene. As soon as the exothermic reaction begins, maintain the temperature by cooling between 30 and 35° C., and continue stirring for 2 to 3 hours.

To the resulting phenyl sodium add dropwise 19.8 gm. of thioxanthene in 120 ml. of absolute benzene. The slightly exothermic reaction ceases after about 1 to 1½ hours.

To this newly formed 9-thioxanthyl sodium add dropwise, with stirring and cooling, 13.1 gm. of N-methyl-3-chloromethyl-piperidine in 30 to 40 ml. of absolute benzene, then continue stirring at about 25° C. for 1½ hours, and heat subsequently to 40° C. for 1 hour. Decompose the resulting mixture by adding carefully a small amount of water, and then extract the newly formed base from the benzene solution by means of dilute hydrochloric acid. The aqueous hydrochloric solution is made alkaline by adding dilute sodium hydroxide, and the thioxanthene base is isolated by extraction with ether. This results in 22 gm. of a slightly yellow, viscous base of boiling point 171 to 175° C./0.07 mm.

The base is acidified with alcoholic hydrochloric acid. Alcohol-ether (1:2) is then added and the hydrochloride salt is crystallized as colorless flakes melting at 211 to 213° C.

I claim:

1. A compound selected from the group consisting of 9-(N-methyl-piperidyl-3-methyl)-thioxanthene and acid salts thereof.

2. A therapeutic composition in dosage unit form comprising a pharmaceutical carrier and from about 5 to about 100 mg. of a compound selected from the group consisting of 9-(N-methyl-piperidyl-3-methyl)-thioxanthene and acid salts thereof.

No references cited.